UNITED STATES PATENT OFFICE.

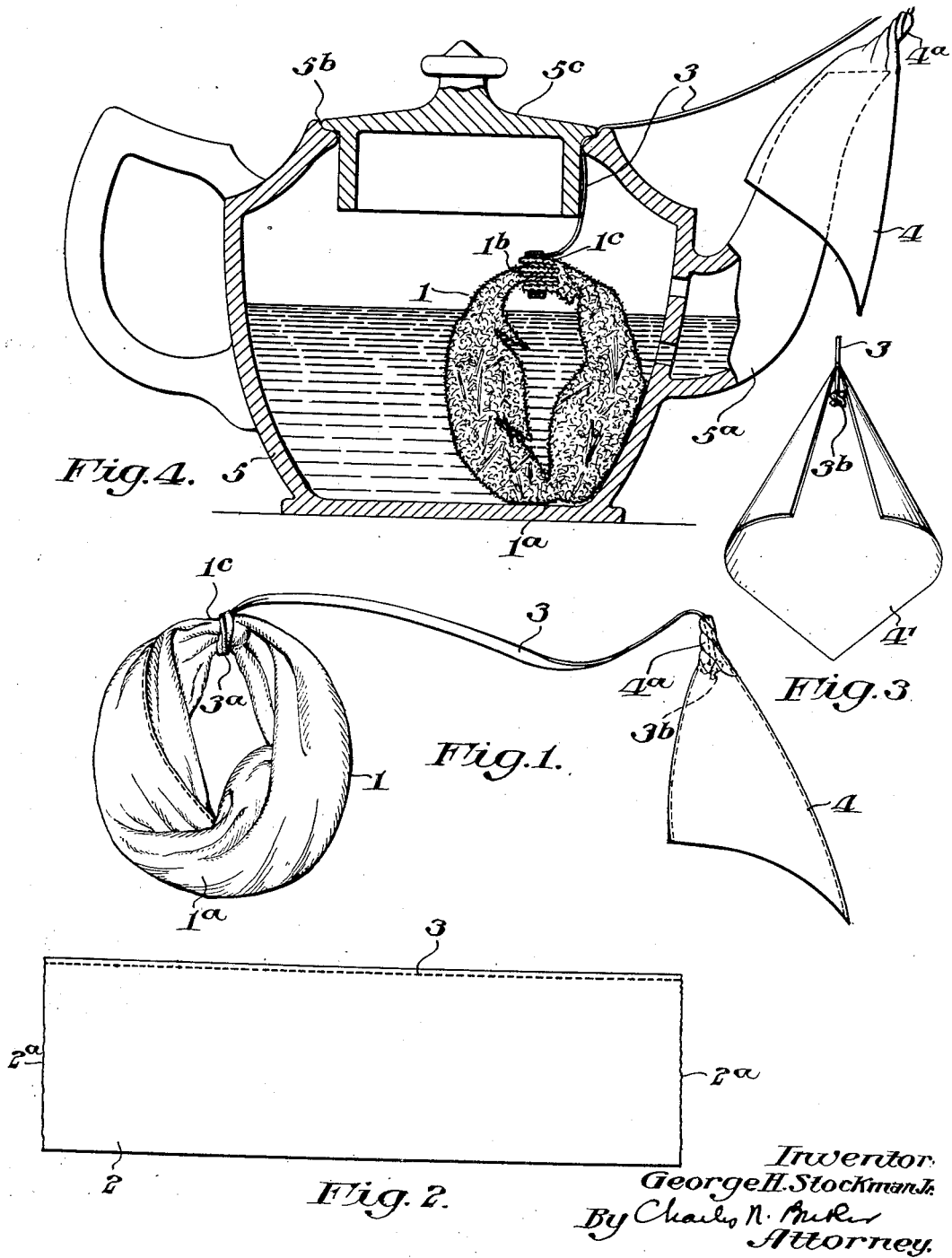

GEORGE H. STOCKMAN, JR., OF PHILADELPHIA, PENNSYLVANIA.

TEA-BREWING APPLIANCE.

1,362,054.      Specification of Letters Patent.      Patented Dec. 14, 1920.

Application filed October 12, 1920. Serial No. 416,342.

*To all whom it may concern:*

Be it known that I, GEORGE H. STOCKMAN, Jr., a citizen of the United States, residing in the city of Philadelphia, county of Philadelphia, and State of Pennsylvania, have invented a new and useful Tea-Brewing Appliance, of which the following is a specification.

My invention is designed to provide an improved tea brewing appliance comprising a peculiar "tea ball" or container adapted for holding tea in loose condition in boiling water in a pot, and a peculiar hood connected with such "ball" or container for covering the spout of the pot to retain therein the steam or vapor with the contained essence of the tea.

In the preferred form of the device, the tea container comprises a tube of loose textile material twisted intermediate its length, with its ends joined to retain the twisted characteristic, by which tea held therein is prevented from packing; the hood comprises a cone, suitably produced from a rectangular piece of paper held to form by twisting the apex of the cone, and a piece of tape or string is combined with and connects the container and hood, having one end tied around the lapped ends of the container and the other end, with a knot thereon, rolled or twisted within the apex of the cone.

In the accompanying drawings, Figure 1 is a side view of an appliance embodying my invention; Fig. 2 is a section of textile material sewed to form a tube having open ends; Fig. 3 is a view of the hood in process of construction; and Fig. 4 is a part sectional elevation of a tea pot with my improved device applied thereto.

The container 1 comprises a tube 2 produced from a strip of woven fabric (preferably open mesh muslin of light weight) by connecting its selvage edges by a row of stitches 3. This tube 2 is twisted intermediate its ends, suitably by a half or full turn; tea is placed in the tube so that it is held in both ends thereof on opposite sides of the twist 1ª; one or both the raw edges 2ª at the ends of the tube are turned in, and the ends are joined by inserting one of them as 1ᵇ within the other 1ᶜ, the raw edge of the latter being hidden.

A piece of string or tape 3 has an end thereof tied in a loop 3ª around the ends 1ᵇ and 1ᶜ, while its other end, provided with a knot 3ᵇ, is engaged to the hood 4 of conoidal form, passing through the twisted apex 4ª within which the knot is held.

The hood 4 is suitably made from a piece of paper 4' rolled to conoidal form with a cover as the apex, within which the knot is placed.

This device is applied to the teapot 5 by placing the charged container 1 therein and the hood 4 on the spout 5ª, the string connecting them through the opening 5ᵇ and being engaged by the lid 5ᶜ. The string serves the purposes of holding the "ball" and hood together, holding the "ball" from settling in the water, holding the hood in place on the spout, and providing convenient means for inserting and withdrawing the "ball."

Having described my invention, I claim:

1. A tea brewing appliance consisting of a container with tea therein, the container comprising an open mesh textile tube twisted intermediate its ends and having said ends connected.

2. A tea brewing appliance consisting of a container comprising a textile tube twisted intermediate its ends and having said ends joined in oppositely projecting relation.

3. A tea brewing appliance consisting of a container comprising a textile tube twisted intermediate its ends and having said ends joined in telescoped relation, in combination with a string binding said ends together.

4. A tea brewing appliance comprising a textile tube containing tea and having its ends bound together so as to form a loop.

5. A tea brewing appliance comprising a twisted textile tube having its ends joined, a string whereby said ends are tied together and a hood connected with said string.

6. A tea brewing appliance comprising a textile tube containing tea, a string whereby the opposite ends of said tube are bound together and a conical hood having its apex fixed to said string.

Signed at Philadelphia, in the county of Philadelphia and State of Pennsylvania, this 22nd day of June, 1920.

GEO. H. STOCKMAN, JR.